United States Patent [19]
Cognaco

[11] 3,903,104
[45] Sept. 2, 1975

[54] 1-(2-Δ²-IMIDAZOLINYL)-2,2-DIARYLCYCLOPROPANES AND PROCESS

[75] Inventor: Jean-Claude Cognaco, Garches, France

[73] Assignee: Hexachimie S.A., Rueil-Malmaison, France

[22] Filed: Nov. 26, 1973

[21] Appl. No.: 418,825

[30] Foreign Application Priority Data
Nov. 30, 1972 United Kingdom............... 55278/72
Feb. 6, 1973 United Kingdom................. 5774/73
Aug. 2, 1973 United Kingdom............... 36777/73

[52] U.S. Cl....... 260/309.6; 260/465 G; 260/465 R; 424/273
[51] Int. Cl............................................ C07d 49/34
[58] Field of Search................................ 260/309.6

[56] References Cited
OTHER PUBLICATIONS
Chem. Abstracts, 78; 111312h.

Primary Examiner—Ethel G. Love
Attorney, Agent, or Firm—Bacon & Thomas

[57] ABSTRACT

The invention relates to compounds of the formula

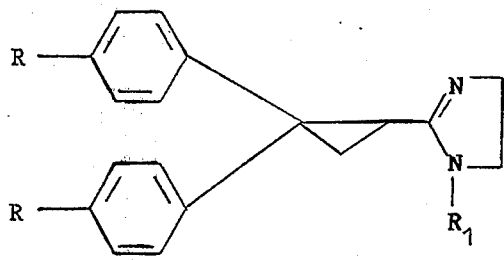

in which R represents the hydrogen atom, the fluorine atom, the bromine atom, a lower $C_1$–$C_5$ alkyl group, a lower $C_1$–$C_5$ alkoxy group, and $R_1$ represents the hydrogen atom, a lower $C_1$–$C_5$-alkyl group, an alkynyl group with at most 5 carbon atoms; an alkenyl group with at most 5 carbon atoms, a lower $C_1$–$C_5$ hydroxy alkyl group or an aralkyl group whose aromatic radical is capable of substitution, and to their acid addition salts as new industrial products.

These compounds and their non-toxic acid addition salts can be used for therapeutic purposes such as in the treatment of cardiovascular disorders.

7 Claims, No Drawings

1-(2-Δ²-IMIDAZOLINYL)-2,2-DIARYLCYCLOPROPANES AND PROCESS

This invention relates to 1-(2 Δ²-imidazolinyl)-2,2-diarylcyclopropanes and their acid addition salts as new industrial products, to a process for their preparation and to their therapeutic application. The invention also relates to the new intermediate compounds from which these products can be synthesised.

The novel compounds according to the invention are selected from the group consisting of:

a. compounds corresponding to the general formula

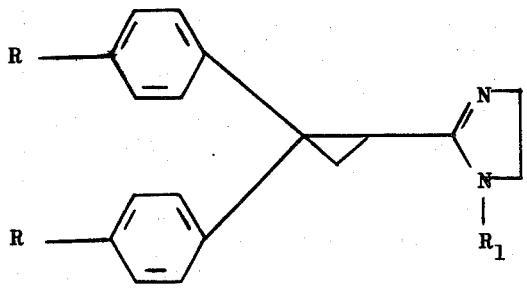

(I)

in which R represents a group selected from the group consisting of the hydrogen atom, the fluorine atom, the bromine atom, a lower $C_1$–$C_5$ alkyl group and a lower $C_1$–$C_5$ alkoxy group; and $R_1$ represents a group selected from the group consisting of the hydrogen atom, a lower $C_1$–$C_5$ alkyl group, an alkenyl group with at most 5 carbon atoms, an alkynyl group with at most 5 carbon atoms, a lower $C_1$–$C_5$ hydroxyalkyl group and an aralkyl group whose aromatic radical is capable of substitution; and b. their acid addition salts.

The hydrocarbon chains of the lower alkyl, lower alkoxy, lower hydroxyalkyl, alkenyl and alkynyl groups are linear or branched and contain at most 5 carbon atoms.

The aromatic radical of the aralkyl group $R_1$ can be monosubstituted or polysubstituted by one or more groups selected from the group comprising F, Br, lower alkyl groups and lower alkoxy groups.

Among the compounds of formula I in which $R_1$ is an aralkyl group, the preferred products are those which correspond to the general formula:

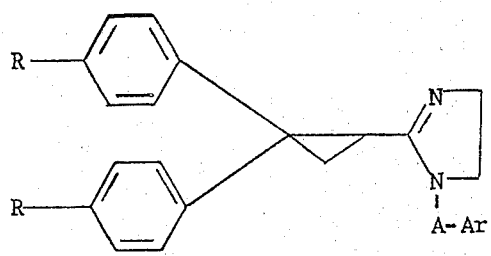

(Ib)

in which R is as defined above, A represents a linear or branched divalent hydrocarbon chain and Ar represents an aromatic group optionally substituted by one or more fluorine atoms, bromine atoms or $C_1$–$C_5$ alkyl and alkoxy groups.

A can represent in particular the groups $CH_2$, $CH_2CH_2$ and $CH(CH_3)$, whilst Ar can represent in particular the groups $C_6H_5$, p-$CH_3$-$C_6H_4$, $(CH_3O)C_6H_4$, $(CH_3O)_2C_6H_3$, $(CH_3O)_3C_6H_2$, for example the 3,4,5-trimethoxyphenyl group.

The compounds of formula I according to the invention are synthesised from a 1-cyano-2,2-diarylcyclopropane corresponding to the formula

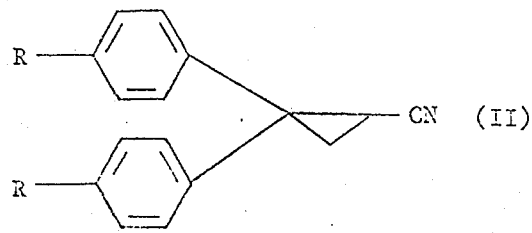

(II)

in which R is as defined above, by a process comprising a. reacting the nitrile of formula II with ethylene diamine monotosylate $H_2N-CH_2-CH_2-NH_2$, p-$CH_3$-$C_6H_4$-$SO_3H$ (III)

and b. if necessary subjecting the compound thus obtained which corresponds to the formula

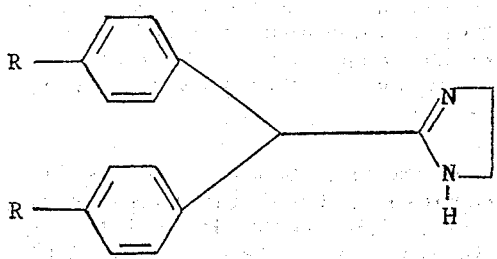

(Ia)

to a metallation reaction and reacting the metallic derivative thus formed with a halide corresponding to the formula $$R_1 - Hal \qquad (IV)$$

in which Hal represents a halogen atom and $R_1$ is different from the hydrogen atom, to form a product of formula I in which $R_1$ is different from the hydrogen atom.

In one preferred embodiment, the reaction of nitrile II with ethylene diamine monotosylate is carried out at 200°C without any need to use a solvent; instead the reaction is merely carried out in an excess of ethylene diamine monotosylate, for example, 2 moles of ethylene diamine monotosylate per mole of nitrile II.

In another preferred embodiment, the metallation reaction is carried out with a compound selected from the group comprising sodium hydride and organolithium compounds of the formula $R_2Li$ where $R_2$ is a $C_1$–$C_5$ alkyl group for phenyl.

In a preferred embodiment, the metallation of a compound Ia with NaH can be carried out in hexamethyl phosphortriamide which is also known as hexametapol or HMPT and which corresponds to the formula:

$$[(CH_3)_2N]_3PO$$

This reaction is carried out over a period of about 6 hours at a temperature of about 90°C.

In another preferred embodiment, the metallation of a compound Ia with $R_2Li$ can be carried out in an inert solvent over a period of about 1 to 3 hours at a temperature in the range from 15° to 25°C. In this case, the organolithium compound can be used in a slight excess, namely 1.1 to 1.2 moles of $R_2Li$ per mole of Ia, the preferred organolithium compound being butyl lithium. Inert solvents suitable for metallation with $R_2Li$ include in particular aliphatic and aromatic hydrocarbons, ethers and tetrahydrofuran. Preferred metallation solvents are hexane, benzene, toluene, xylene, diethylether and tetrahydrofuran.

The acid addition salts of the compounds of formula I are obtained by reaction with a mineral or organic acid by methods known per se. Acids which can be used for this purpose include in particular hydrochloric acid, sulphuric acid, phosphoric acid, oxalic acid, succinic acid, methane sulphonic acid, cyclohexyl sulphamic acid, formic acid, aspartic acid, glutamic acid, N-acetyl aspartic acid, N-acetyl glutamic acid, ascorbic acid, maleic acid, malic acid, fumaric acid, lactic acid, benzoic acid, cinnamic acid, p-toluene sulphonic acid.

The compounds according to the invention are suitable for use in therapeutic compositions intended in particular for the treatment of disorders affecting the cardiovascular system, distinguished by the fact that they contain at least one compound of formula I or one of its non-toxic acid addition salts in association with a physiologically acceptable excipient.

The invention also relates to the 1-cyano-2,2-diaryl cyclopropanes of formula II, in which R is different from the hydrogen atom, as new intermediate compounds. These intermediate compounds are obtained by the action of a diaryl diazomethane on acrylonitrile in an anhydrous solvent such as in particular petroleum ether, hexane, cyclohexane, heptane, chloroform, diethylether.

Other advantages and features of the invention will be apparent from the following Examples in which Examples 1 and 2 relate to the synthesis of nitriles of formula II, Examples 3 to 5 relate to the synthesis of compounds of formula Ia, Examples 6 to 12 relate to metallation with NaH and Examples 13 to 18 relate to metallation with $R_2Li$.

EXAMPLE 1

1-Cyano-2,2-di-p-tolyl cyclopropane (Formula II; R = $CH_3$)

0.55 mole of acrylonitrile are added dropwise with stirring to a solution of 0.5 mole of di-p-tolyl diazomethane in 300 cc of chloroform at a temperature kept at around 40°C, if necessary by means of a cold water bath. On completion of the addition, the reaction mixture is stirred. At the end of 5 hours, the solution is colourless and the evolution of nitrogen at an end.

The solvent is evaporated in vacuo and the residue taken up in 400 cc of pentane. The product crystallises, is filtered and dried.

Yield 85 % m.p. 67°C

Analysis: N % calculated: 5.67; found: 5.82.

EXAMPLE 2

1-Cyano-2,2-di-p-fluorophenyl cyclopropane (Formula II; R = F)

The procedure is as described in Example 1, except that 0.5 mole of di-p-fluorophenyl diazomethane is used instead of di-p-tolylphenyl diazomethane, the reaction being carried out in 500 cc of ether at a temperature of 30°C. Following evaporation of the solvent, the residue is distilled in vacuo.

Yield 50 % b.p.$_{0.5}$ mm: 160°–163°C m.p. 95°C

Analysis: N % calculated: 5.50; found: 5.44.

EXAMPLE 3

1-(2-$\Delta^2$-imidazolinyl)-2,2-diphenylcyclopropane (Formula VI)

A mixture of 0.5 mole of 1-cyano-2,2-diphenylcyclopropane and 1 mole of ethylene diamine monotosylate (III) is heated progressively to a temperature of 200°C and is kept at that temperature for a period of 2 hours. The mixture is then left to cool and taken up in 1.2 mole of sodium hydroxide in 400 cc of water, followed by the addition of 200 cc of chloroform. The chloroform is decanted and the aqueous phase reextracted with 100 cc of chloroform. The extract is dried over sodium sulphate and the chloroform removed in vacuo. The product is taken up in 300 cc of petroleum ether, crystallises and is then filtered and dried.

Yield 91 % m.p. 103-104°C

Analysis: N % calculated: 10.68; found: 10.50.

Preparation of the succinate 0.1 mole of succinic acid is dissolved under heat in 120 cc of isopropanol followed by the addition of 0.1 mole of 1-(2-$\Delta^2$-imidazolinyl)-2,2-diphenylcyclopropane, obtained as described above, in 50 cc of isopropanol. After cooling, 100 cc of ether are added. The product crystallises, is filtered and then recrystallised from a mixture of ethanol and ether (70:30).

Yield 85 % m.p. 165°C
Analysis N % calculated: 7.35; found: 7.28.

EXAMPLE 4

1-(2-$\Delta^2$-imidazolinyl)-2,2-di-p-tolyl cyclopropane (Formula VII)

The procedure is as in Example 3, except that the 1-cyano-2,2-diphenylcyclopropane is replaced by 1-cyano-2,2-di-p-tolyl cyclopropane (0.5 mole) prepared in accordance with Example 1.

Preparation of the hydrochloride

Following evaporation of the chloroform as indicated in Example 3, the residue is taken up in 200 cc of isopropanol followed by the addition of ethyl chloride and finally by the addition of 150 cc of ether. After trituration, the product crystallises, is filtered, washed with ether and dried. It is recrystallised from a mixture of isopropanol and ether (80 : 20).

Yield 70 % m.p. 260°C
Analysis: Cl % calculated: 10.86; found: 10.9. N % calculated: 8.56; found: 8.7.

EXAMPLE 5

1-(2-$\Delta^2$-imidazolinyl)-2,2-di-p-fluorophenyl cyclopropane (Formula VIII)

The procedure is as in Example 3, except that the 1-cyano-2,2-diphenylcyclopropane is replaced by 1-cyano-2,2-di-p-fluorophenyl cyclopropane (0.5 mole) prepared in accordance with Example 2.

Preparation of the hydrochloride

The procedure is as in Example 4; recrystallisation of the hydrochloride of 1-(2-$\Delta^2$-imidazolinyl)-2,2-di-p-fluorophenyl cyclopropane from a mixture of ethanol and ether (70:30) gives a product with the following characteristics:

Yield 57 % m.p. 266°C
Analysis: N % calculated: 8.37; found: 8.41.

EXAMPLE 6

1-[2-(N-benzyl)-$\Delta^2$-imidazolinyl]-2,2-diphenylcyclopropane (Formula IX)

A solution of 0.1 mole of 1-(2-$\Delta^2$-imidaazolinyl)-2,2-diphenylcyclopropane, prepared in accordance with Example 3, in 50 cc of hexamethyl phosphortriamide, is added dropwise with stirring to 0.1 mole of sodium hydride in 20 cc of hexamethyl phosphortriamide heated to 90°C. On completion of the addition, the mixture is stirred for 6 hours at 90°C. The reaction mixture is then cooled in an ice bath, followed by the dropwise addition of 0.12 mole of benzyl chloride, the temperature being kept at around 25°C. After the heat effect has abated, the reaction mixture is stirred for 2 hours at ambient temperature (15° to 25°C). It is then poured onto 300 cc of water, extracted with ether, dried over magnesium sulphate and the ether removed.

Preparation of the hydrochloride

The evaporation residue is taken up in 50 cc of ether, ethyl chloride added up to pH 1, followed by trituration. After crystallisation, the product is filtered, washed with ether and dried. It is then recrystallised from a mixture of isopropanol and ether (70:30).

Yield 43 % m.p. 202°C
Analysis: N % calculated: 7.20; found: 7.3.

EXAMPLE 7

1-[2-(N-p-methylbenzyl)-$\Delta^2$-imidazolinyl]-2,2-diphenylcyclo-propane (Formula X)

The procedure is as in Example 6, except that the benzyl chloride is replaced by p-$CH_3$-$C_6H_4$-$CH_2$Cl (0.12 mole).

Preparation of the hydrochloride

The hydrochloride of 1-[2-(N-p-methylbenzyl)-$\Delta^2$-imidazolinyl]-2,2-diphenylcyclopropane is prepared in the same way as described in Example 6. It has the following characteristics:

Yield 39 % m.p. 204°–206°C
Analysis: N % calculated: 6.95; found: 7.0.

EXAMPLE 8

1-[2-(N-benzyl)-$\Delta^2$-imidazolinyl]-2,2-di-p-tolyl cyclopropane (Formula XI)

The procedure is as in Example 6, except that the 1-(2-$\Delta^2$-imidazolinyl)-2,2-diphenylcyclopropane is replaced by 1-(2-$\Delta^2$-imidazolinyl)-2,2-di-p-tolyl cyclopropane (0.1 mole) prepared in accordance with Example 4.

Preparation of the methane sulphonate

The evaporation residue is taken up in 100 cc of ether and mixed with 0.1 mole of methane sulphonic acid in 50 cc of ether, followed by trituration. The produce crystallises, is filtered, washed with ether and dried, followed by recrystallisation from a mixture of isopropanol and ether (70:30).

Yield 40 % m.p. 195°C
Analysis: N % calculated: 5.87; found: 5.9.

EXAMPLE 9

1-[2-(N-α-phenethyl)-$\Delta^2$-imidazolinyl]-2,2-diphenyl-cyclo-propane (Formula XII)

The procedure is as in Example 6, except that the benzyl chloride (0.12 mole) is replaced by α-phenethyl chloride (0.11 mole).

Preparation of the oxalate

The residue left following evaporation of the ether is purified by filtration on basic alumina (elution with ether). Evaporation of the ether used for elution leaves 0.015 mole of crude base which is taken up in 0.015 mole of oxalic acid in 20 cc of isopropanol, followed by the addition of 80 cc of ether. The product crystallises, is filtered and then recrystallised from a mixture of isopropanol and ether (70:30).
Yield 12 % m.p. 148°C
Analysis: N % calculated: 6.14; found: 6.07.

EXAMPLE 10

1-[2-(N-allyl)-$\Delta^2$-imidazolinyl]-2,2-diphenylcyclopropane (Formula XIII)

The procedure is as in Example 6, except that the benzyl chloride is replaced by allyl bromide (0.11 mole).

Preparation of the oxalate

The residue left following evaporation of the ether is taken up in 0.1 mole of oxalic acid in a mixture of 80 cc of acetone and 20 cc of ether, followed by trituration. The product crystallises, is filtered, washed with 20 cc of acetone and then recrystallised from a mixture of isopropanol and ether (65:35).
Yield 51 % m.p. 146°C
Analysis N % calculated: 7.14; found: 7.20.

EXAMPLE 11

1-[2-(N-butyl)-$\Delta^2$-imidazolinyl]-2,2-diphenylcyclopropane (Formula XIV)

The procedure is as in Example 6 except that the benzyl chloride is replaced by n-butyl bromide (0.11 mole).

Preparation of the oxalate

The residue left following evaporation of the ether is taken up in 0.1 mole of oxalic acid in 100 cc of acetone, followed by trituration. The product crystallises, is filtered, washed with 20 cc of acetone and recrystallised from a mixture of methanol and ether (60:40).
Yield 47 % m.p. 176°C
Analysis: N % calculated: 6.85; found: 6.72.

EXAMPLE 12

1-[2-(N-isopropyl)-$\Delta^2$-imidazolinyl]-2,2-diphenylcyclopropane (Formula XV)

The procedure is as in Example 6, except that the benzyl chloride is replaced by isopropyl bromide (0.11 mole).

Preparation of the oxalate

The residue left following evaporation of the ether is taken up in 0.1 mole of oxalic acid in 100 cc of acetone, followed by trituration. The product crystallises, is filtered, washed with 20 cc of acetone and recrystallised from a mixture of isopropanol and ether (70:30).
Yield 41 % m.p. 166°C
Analysis: N % calculated: 7.09; found: 7.13.

EXAMPLE 13

1-[2-(N-allyl)-$\Delta^2$-imidazolinyl]-2,2-diphenylcyclopropane (Formula XIII)

0.11 mole (44 cc) of a 2.5 M solution of butyl lithium in hexane are added to 0.1 mole of 1-[2-$\Delta^2$-imidazolinyl]-2,2-diphenylcyclopropane in 100 cc of anhydrous benzene at a temperature kept at around 20°C. The mixture is then stirred for 2 hours at ambient temperature (15° to 25°C). 0.12 mole (10.4 cc) of allyl bromide is then added dropwise to the reaction medium, keeping the temperature at around 25°C. The reaction mixture is then stirred at ambient temperature until it is homogeneous (which takes about 2 hours), after which it is refluxed for 3 hours. After cooling, 100 cc of water are added, the mixture stirred for 10 minutes, decanted, extracted with 200 cc of ether, dried over magnesium sulphate and the solvent evaporated in vacuo.

Preparation of the hydrochloride

The preceding evaporation residue is taken up in a mixture of 30 cc of isopropanol and 90 cc of ether and ethyl chloride added with stirring up to pH 1. After standing for 3 hours, the product is filtered, washed with ether and dried, followed by recrystallisation from a mixture of isopropanol and ether (40:60).
Yield 72 % m.p. 194°C
Analysis: N % calculated: 8.25; found: 8.19.

EXAMPLE 14

1-[2-(N-butyl)-$\Delta^2$-imidazolinyl]-2,2-diphenylcyclopropane (Formula XIV)

The procedure is as in Example 13 except that the allyl bromide is replaced by n-butyl bromide (0.12 mole).

Preparation of the oxalate

The residue left following evaporation of the ether is taken up in 0.1 mole of oxalic acid in 100 cc of acetone, followed by trituration. The product crystallises, is filtered, washed with 20 cc of acetone and recrystallised from a mixture of methanol and ether (60:40).
Yield 69 % m.p. 176°C
Analysis: N % calculated: 6.85; found: 6.79.
As might have been expected, the analytical results obtained coincide with those of Example 11.

EXAMPLE 15

1-[2-(N-benzyl)-$\Delta^2$-imidazolinyl]-2,2-di-p-tolyl cyclopropane (Formula XI)

The procedure is as in Example 13, except that the allyl bromide is replaced by benzyl chloride (0.12 mole) and the 1-(2-$\Delta^2$-imidazolinyl)-2,2-diphenylcyclopropane by 1-(2-$\Delta^2$-imidazolinyl-2,2-di-p-tolyl cyclopropane (0.1 mole).

Preparation of the methane sulphonate

The evaporation residue is taken up in 100 cc of ether, 0.1 mole of methane sulphonic acid, dissolved in 100 cc of ether, added, followed by trituration. The product crystallises, is filtered, washed with ether and dried, followed by recrystallisation from a mixture of isopropanol and ether (70:30).
Yield 66 % m.p. 195°C
Analysis: N % calculated: 5.87; found: 5.9.
As might have been expected, the analytical results obtained coincide with those of Example 8.

EXAMPLE 16

1-[2-(N-methyl)-$\Delta^2$-imidazolinyl]-2,2-diphenylcyclopropane (Formula XVI)

0.11 mole (44 cc) of a 2.5 M solution of butyl lithium in hexane is added to 0.1 mole of 1-[2-$\Delta^2$-imidazolinyl]-2,2-diphenylcyclopropane in 100 cc of anhydrous benzene at a temperature kept at around 20°C. The mixture is then stirred for 2 hours at ambient temperature (15° to 25°C). 0.12 mole (10.4 cc) of methyl iodide is added dropwise to the reaction mixture, keeping the temperature at around 25°C. The reaction mixture is then stirred at ambient temperature until it is homogeneous (which takes about 2 hours), and is then refluxed for 3 hours. After cooling, 100 cc of water are added and the mixture stirred for 10 minutes, decanted, extracted with 200 cc of ether, dried over magnesium sulphate and the solvent evaporated in vacuo.

Preparation of the hydrochloride

The residue left following evaporation of the ether is dissolved in 100 cc of acetone and ethyl chloride added to the resulting solution up to pH 1. After standing for 1 hour, the product is filtered and recrystallised from a mixture of ethanol and ether (70:30).

Yield 54 % m.p. 260°C

Analysis: N % calculated: 8.96; found: 8.83.

EXAMPLE 17

1-[2-(N-3',4',5'-trimethoxybenzyl)-$\Delta^2$-imidazolinyl]-2,2-diphenylcyclopropane (Formula XVII)

The procedure is as in Example 16, except that the methyl iodide is replaced by 3,4,5-trimethoxybenzyl chloride (0.11 mole).

Preparation of the p-toluene sulphonate

The evaporation residue is dissolved in 100 cc of ethylacetate and the resulting solution mixed with a solution of 0.1 mole of p-toluene sulphonic acid in 100 cc of ethylacetate. After standing for 3 hours, the product is filtered, washed with 50 cc of ethylacetate and dried.

Yield 70 % m.p. 174°C

Analysis: N % calculated: 4.56; found: 4.5.

EXAMPLE 18

1-[2-(N-hydroxyethyl)-$\Delta^2$-imidazolinyl]-2,2-diphenylcyclo-propane (Formula XVIII)

The procedure is as in Example 16, except that the methyl iodide is replaced by bromoethanol pyranyl ether (0.11 mole).

Preparation of the hydrochloride

The residue left following evaporation of the ether is taken up in 80 cc of ethanol, followed by the addition of 0.2 mole of concentrated hydrochloric acid at a temperature kept at around 20°C. After standing for 1 hour, 240 cc of water are added, the product extracted with ether, the aqueous phase alkalised with sodium hydroxide, extracted with ether, dried over sodium sulphate and the ether removed in vacuo.

The residue is taken up in the mixture of 150 cc of isopropanol and 100 cc of ether, followed by the addition of ethyl chloride up to pH 1. After standing for 3 hours, the product is filtered, washed with a mixture of isopropanol and ether (50:50) and then with ether, and dried.

Yield 68 % m.p. 215°C

Analysis: N % calculated: 8.16; found: 8.20.

Pharmacological tests carried out with the products according to the invention are summarised in the following.

I — ANTI-ARRHYTHMIC ACTIVITY
Arrhythmia induced by aconitine nitrate

Method

Groups of 6 male Wistar rats weighing 200 to 250 g are anesthetised with 1.2 g/kg of urethane administered by intraperitoneal injection. A jugular vein is released and used for the perfusion (Braun perfusor) of a solution of aconitine nitrate (concentration: 50 γ/ml; perfusion rate 0.2 ml/min). The products to be tested are also administered through the jugular vein 1 minute before the beginning of perfusion.

All the solutions are prepared in an aqueous solution of sodium chloride (9 g/l).

The D 2 derivation electrocardiogram (a D 2 derivation electrocardiogram is an electrocardiogram recorded by fastening receiver electrodes to the right-hand front paw and the left-hand rear paw and a glass electrode to the right-hand rear paw) is recorded and the perfusion time required to obtain the first ventricular arrhythmia is noted. The intravenous dose of perfused aconitine in γ/kg and the percentage increase in relation to the controls are calculated. The dose which increases by 60 % the quantity of aconitine required to obtain the first ventricular arrhythmia, referred to as the 60 % active dose (DA 60), is used for comparison. The results are set out in Table I below which shows the average quantities of aconitine perfused (γ/kg) and the DA 60.

TABLE I

| mg/kg IV | Ex. 3 (a) | Ex. 4 (b) | Ex. 5 (b) | Ex. 6 (b) | Ex. 7 (b) | Ex. 8 (c) | Ex. 9 (d) | Ex. 10 (d) | Ex. 11 (d) | Ex. 12 (d) | Ex. 16 (b) | Ex. 17 (e) | Ex. 18 (b) |
|---|---|---|---|---|---|---|---|---|---|---|---|---|---|
| 0 | 61.0 | 65.1 | 62.9 | 65.3 | 63.1 | 68.4 | 74.5 | 60.0 | 61.2 | 73.7 | — | — | — |
| 0.312 | — | — | — | 81.2 | — | — | — | — | — | — | — | — | — |
| 0.625 | — | — | — | 103.8 | 82.0 | — | — | 84.1 | — | — | — | 10 | — |
| 1.250 | 79.8 | — | — | 122.9 | 89.0 | 77.2 | — | 94.3 | 80.8 | 71.8 | 42 | 47 | 8 |
| 2.50 | 95.6 | 88.6 | 84.3 | — | 105.6 | 88.0 | — | 116.0 | 98.3 | 93.4 | 60 | 85 | 41 |
| 5 | 112.7 | 96.2 | 86.0 | — | — | 117.0 | — | — | 120.1 | 118.0 | 100 | — | 61 |
| 10 | — | 119.5 | 115.2 | — | — | 198.0 | — | — | — | — | — | — | 125 |
| 20 | — | — | 181.9 | — | — | — | 74.2 | — | — | — | — | — | — |
| 40 | — | — | — | — | — | — | 81.7 | — | — | — | — | — | — |

TABLE I —Continued

| mg/kg IV | Ex. 3 (a) | Ex. 4 (b) | Ex. 5 (b) | Ex. 6 (b) | Ex. 7 (b) | Ex. 8 (c) | Ex. 9 (d) | Ex. 10 (d) | Ex. 11 (d) | Ex. 12 (d) | Ex. 16 (b) | Ex. 17 (e) | Ex. 18 (b) |
|---|---|---|---|---|---|---|---|---|---|---|---|---|---|
| DA 60 mg/kg TV | 2.6 | 5.7 | 4.9 | 0.6 | 2.1 | 4.4 | >40 | 1.7 | 2.4 | 5.3 | 2.1 | 1.55 | 3.4 |

IV = intravenous dose
(a) succinate
(b) hydrochloride
(c) methane sulphonate
(d) oxalate
(e) p-toluene sulphonate Arrhythmia by coronary ligature Method Live dogs are anesthetised with an intravenous dose of 120 mg/kg of chloralose and placed under artificial respiration. The thoracic cage is opened at the level of the fourth intercostal space, the pericardium insized and the interventricular artery disected about 1 cm below the junction with the circumflex artery. A first partial ligature is made, leaving a space of about 9/10ths of a millimetre, the ligature proper being made 30 minutes afterwards. The thoracic cage is reclosed, normal respiration established and, 24 hours later, the dogs are ready for experimentation.

The electrocardiogram (D 2 derivation) is recorded. Marks are awarded on the following basis:

0 = arrhythmic trace
0.5 = sinusal deflections on an arrhythmic base
1 = arrhythmic deflection on a sinusal base
2 = sinusal rhythm.

The following results were obtained:
In five dogs, the succinate of the product of Example 3, administered in a dose of 10 mg/kg of IV, produced the following marks:

0.5; 2; 2; 2; 2 i.e. virtual reestablishment of the sinusal rhythm in every case.

In six dogs, the hydrochloride of the product of Example 6, administered in a dose of 2.5 mg/kg of IV, produced the following marks:

2; 1; 2; 2; 0; 2 i.e. reestablishment of the sinusal rhythm five times out of six.

In three dogs, the oxalate of Example 10, administered in a dose of 5mg/kg of IV, produced the following marks:

2; 2; 2 i.e. reestablishment of the sinusal rhythm three times out of three.

In five dogs, the hydrochloride of Example 18, administered in a dose of 2.5 mg/kg of IV, produced the following marks:

0.5; 1; 1; 2; 2 and marks of

2; 2 when administered to two dogs in a dose of 5 mg/kg of IV, corresponding to complete reestablishment of the sinusal rhythm.

II — INTRAVENOUS TOXICITY

Method

The products are administered rapidly by intravenous injection to groups of three male Wistar rats weighing from 110 to 130 g. Mortality is observed after 7 days.

The results are set out in Table II below where the last non-mortal dose (DL 0) and the dose killing all the rats (DL 100) are shown. These doses are in mg/kg.

TABLE II

| Examples | DL 0 I.V. | DL 100 I.V. |
|---|---|---|
| 3 (a) | 32 | 64 |
| 4 (b) | 16 | 64 |
| 5 (b) | 16 | 64 |
| 6 (b) | 8 | 16 |
| 7 (b) | 16 | 32 |
| 8 (c) | 16 | 32 |
| 9 (d) | 16 | 32 |
| 10 (d) | 16 | 32 |
| 11 (d) | 8 | 16 |
| 12 (d) | 16 | 32 |

(a) succinate
(b) hydrochloride
(c) methane sulphonate
(d) oxalate

In human therapy, the compounds of formula I and their non-toxic addition salts can be administered in particular orally or by injection. Capsules containing 50 mg of active principle are prescribed for oral administration and ampoules containing 5 mg of active ingredient for administration by injection.

In the form of capsules, the product of Example 3 can be used in the prophylaxis and treatment of supraventricular, nodal and auricular tachycardia and of extrasystoles.

When administered by injection, it quickly reestablishes rhythm in the event of ventricular extrasystoles.

(VI) 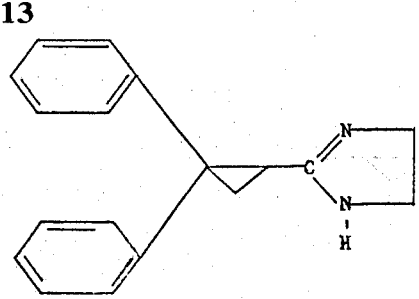
(VII) 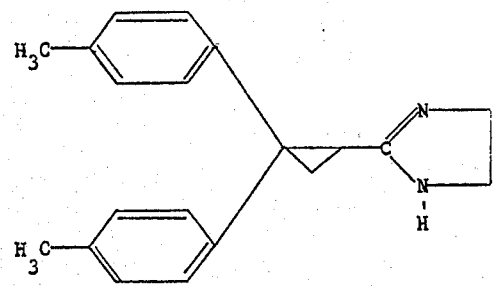
(VIII) 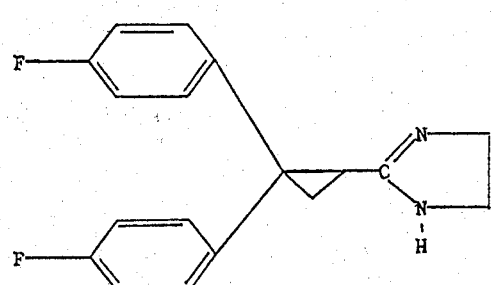
(IX) 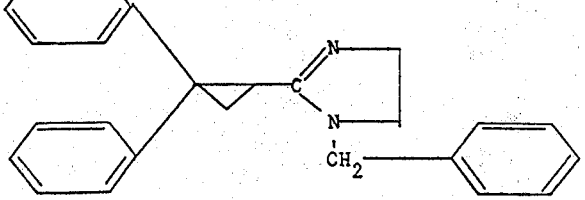
(X) 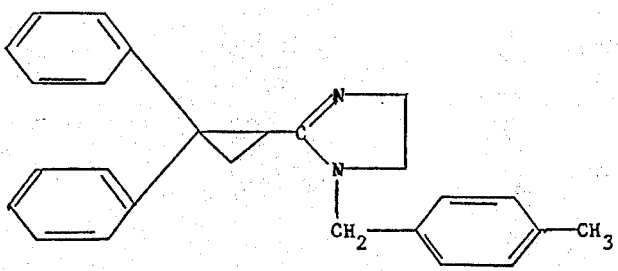
(XI) 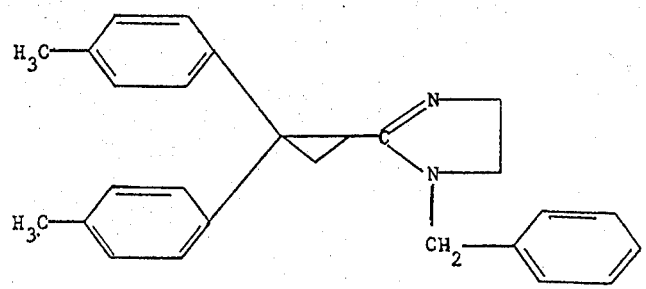

(XII) 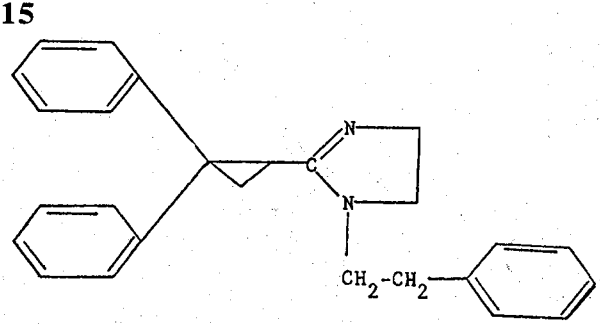
(XIII) 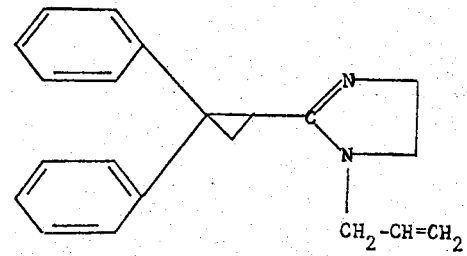
(XIV) 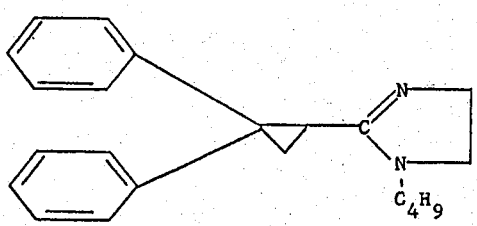
(XV) 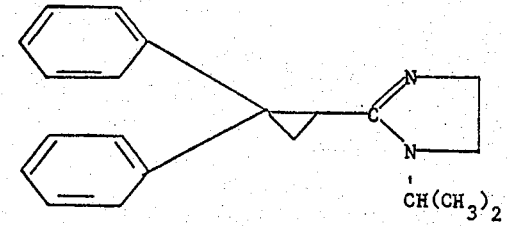
(XVI) 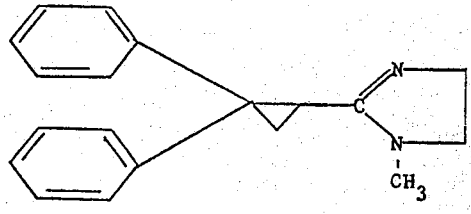
(XVII) 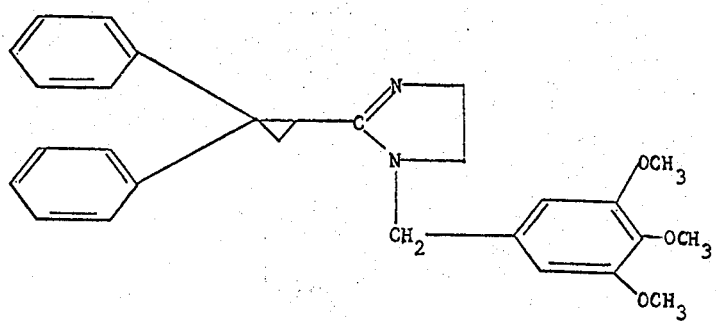

(XVIII) 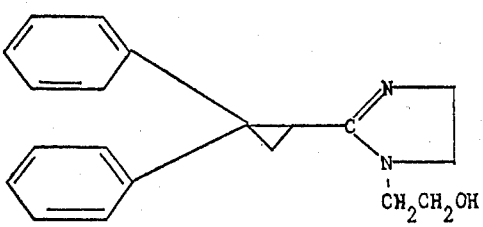

I claim:
1. 1-(2-Δ²-imidazolinyl)-2,2-diarylcyclopropanes selected from the group consisting of
 a. compounds corresponding to the general formula

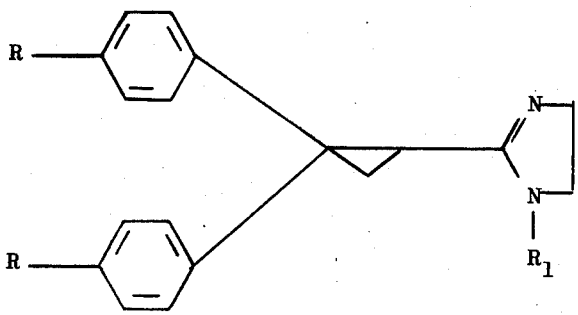

(I)

in which R is a group selected from the group consisting of the hydrogen atom, the fluorine atom, the bromine atom, a lower $C_1$–$C_5$ alkyl group and a lower $C_1$–$C_5$ alkoxy group; and $R_1$ is a group selected from the group consisting of the hydrogen atom, a lower $C_1$–$C_5$ alkyl group, an alkenyl group with at most 5 carbon atoms, an alkynyl group with at most 5 carbon atoms, a lower $C_1$–$C_5$ hydroxy alkyl group or a phenylalkyl group which is capable of being substituted by at least one group selected from the group consisting of F, Br, lower $C_1$–$C_5$ alkyl groups and lower $C_1$–$C_5$ alkoxy groups; and
 b. their pharmaceutically acceptable acid addition salts.

2. Compounds according to claim 1, wherein R is selected from the group consisting of H, F and $CH_3$ and $R_1$ is selected from the group consisting of H, $C_6H_5CH_2$, p-$CH_3C_6H_4CH_2$, $C_6H_5CH_2CH_2$, $CH_3$, $CH_2$=$CHCH_2$, n-$C_4H_9$, $(CH_3)_2CH$, $HOCH_2CH_2$ and 3,4,5-$(CH_3O)_3C_6H_2CH_2$.

3. 1-(2-Δ²-imidazolinyl) 2,2-diphenylcyclopropane and its pharmaceutically acceptable acid addition salts.

4. 1-(2-Δ²-imidazolinyl)-2,2-di-p-fluorophenyl cyclopropane and its pharmaceutically acceptable acid addition salts.

5. 1-[2-(N-allyl)-Δ²-imidazolinyl]-2,2-diphenylcyclopropane and its pharmaceutically acceptable acid addition salts.

6. 1-[2-(N-3′,4′,5′-trimethoxybenzyl)-Δ²-imidazolinyl]-2,2-diphenylcyclopropane and its pharmaceutically acceptable acid addition salts.

7. 1-[2-(N-hydroxyethyl)-Δ²-imidazolinyl]-2,2-diphenyl-cyclopropane and its pharmaceutically acceptable acid addition salts.

* * * * *